United States Patent

Naito

Patent Number: 5,941,359
Date of Patent: Aug. 24, 1999

[54] POSITIONING APPARATUS

[75] Inventor: Yoshikatsu Naito, Kawanishi, Japan

[73] Assignee: Printe, Co., Ltd., Hyogo, Japan

[21] Appl. No.: 08/915,983

[22] Filed: Aug. 21, 1997

[51] Int. Cl.$^6$ ....................................................... H02K 7/10
[52] U.S. Cl. .......................... 192/146; 318/369; 318/467; 318/600
[58] Field of Search ............................. 192/146; 318/369, 318/467, 600

[56] References Cited

U.S. PATENT DOCUMENTS 3,633,718  1/1972  Wanner et al. ......................... 192/146
3,716,773  2/1973  Raoul ..................................... 318/600

FOREIGN PATENT DOCUMENTS 4-43412  2/1992  Japan .

Primary Examiner—Allan D. Herrmann
Attorney, Agent, or Firm—Marshall, O'Toole, Gerstein, Murray & Borun

[57] ABSTRACT

A control object can be stopped at a target position with high precision by decelerating braking performed by decreasing a control speed of a speed controller and by decelerating braking performed by braking operation of a brake device. A positioning apparatus includes a rotation detecting sensor S coupled to a rotary shaft for rotating or rectilinearly driving a control object. A normal-reverse rotation discriminating circuit DD for discriminating normal rotation of the rotary shaft from reverse rotation thereof. A first decelerating position memory B1 for holding at least one decelerating position where low-speed driving operation is to be started, and second decelerating position memory B2 for holding at least one decelerating position where braking operation is to be started. First and second decelerating position comparators CP1 and CP2 for comparing counted values with first and second decelerating positions in the first and second decelerating position memories B1 and B2. A rotation speed controller for rotating the rotary shaft of the rotation driving source at a constant speed. Driving controller DR for outputting a decelerating signal for changing a control speed to the rotation speed controller on the basis of a result of comparison output from the first decelerating position comparator, a brake device decreasing at least the rotation speed as a result of comparison output from the second decelerating position comparator, and brake control means BR for outputting a brake signal to the brake device.

3 Claims, 2 Drawing Sheets

POSITIONING APPARATUS

BACKGROUND OF THE INVENTION

1. Field of the Invention

The present invention relates to positioning control for stopping a control object at a control target position, and more particularly to a positioning apparatus for driving the control object to the target position by rotation speed control and braking operation.

2. Prior Art

The present applicant has disclosed, in Japanese Unexamined Patent Publication No. 4-43412, an intermittent rotation driving control system comprising an intermittent rotation driving control mechanism and a clutch controller thereof, the intermittent rotation driving control mechanism including an input shaft coupled to a rotation driving source through a main clutch mechanism, two gear mechanisms coupled to the input shaft through a control clutch, and an output shaft coupled to the gear mechanisms which are engaged opposite to each other.

The intermittent rotation driving control system operates in the following manner. After the output shaft reaches a preset first decelerating position during rotation of the output shaft performed by selectively turning on the main clutch mechanism and either of first and second control clutch mechanisms, the first and second control clutch mechanisms are turned on at the same time to perform braking operation. Every time a speed has a value equal to or less than a predetermined value, the braking operation is released. After the output shaft reaches a second decelerating position, the first and second control clutch mechanisms are alternately turned on and off in order to compensate for a displacement of the output shaft from a target position. Thus, a control object is stopped at the target position.

The clutch controller forming such a system comprises a rotation speed detector for detecting a rotation speed of the output shaft, rotation speed discriminating means having a speed level discriminating circuit for discriminating a level of a speed signal output from the rotation speed detector and for outputting a brake release signal when the speed signal is reduced to a predetermined level, pulse generating means for generating a pulse signal with the rotation of the output shaft, rotation angle detecting means including a counter circuit section for counting the pulse signal sent from the pulse generating means, a direction discriminating circuit for discriminating a rotation direction of the output shaft, a displacement discriminating circuit for discriminating a displacement area which fluctuates around the control target position of the output shaft, and a control circuit for turning on and off a clutch in response to a normal-reverse rotation command signal, first and second decelerating position reach signals and a direction discriminating signal sent from the rotation speed discriminating circuit.

According to such a system, the intermittent rotation driving mechanism for giving a high torque output can be driven instantaneously and intermittently with high precision. Therefore, it is possible to perform positioning control having a high output torque which cannot be performed in the prior art. Furthermore, even if a load having great inertia force is applied, intermittent rotation driving operation can be performed with high precision.

Conventionally, there have been a positioning apparatus for performing positioning operation only by braking using a brake device and a positioning apparatus for braking a control object by using only an electronic brake, for example, DC dynamic braking of an inverter controller, thus performing the positioning control.

However, the intermittent rotation driving control system has the following problems.

More specifically, the first and second clutch mechanisms are turned on at the same time so that the rotation speed of the output shaft is decreased during deceleration braking operation. During damping oscillation, the first and second clutch mechanisms are alternately turned on and off so that the output shaft repeatedly performs reverse rotation to oscillate. In other words, a slide of the clutch mechanism is utilized to perform speed control. Therefore, it is necessary to allow for a rise in a temperature caused by heat generation of the clutch mechanism.

In addition, the intermittent rotation driving mechanism for performing the intermittent rotation driving operation is required. Consequently, a size of the apparatus and a cost thereof are increased. Furthermore, such a system cannot be exactly applied to an existing positioning control system for performing inverter control and additionally needs a mechanism portion.

In consideration of the foregoing, it is an object of the present invention to provide a positioning apparatus capable of performing positioning control with high precision without using the intermittent rotation driving control mechanism.

SUMMARY OF THE INVENTION

The first aspect of the present invention is directed to a positioning apparatus comprising a rotation detecting sensor coupled to a rotary shaft for rotating or rectilinearly driving a control object for outputting two or more pulses having a phase difference with rotation of the rotary shaft, normal-reverse rotation discriminating means for discriminating normal rotation of the rotary shaft from reverse rotation thereof on the basis of a relationship between phases of the two or more pulses output from the rotation detecting sensor, pulse counting means for adding or subtracting the pulses output from the rotation detecting sensor in response to a discriminating signal output from the normal-reverse rotation discriminating circuit, first decelerating position storing means for holding at least one decelerating position where low-speed driving operation is to be started, second decelerating position storing means for holding at least one decelerating position where braking operation is to be started, first and second decelerating position comparing means for comparing a value counted by the pulse counting means with first and second decelerating positions held by the first and second decelerating position storing means, a rotation speed controller for rotating the rotary shaft of the rotation driving source at a constant speed by inverter control, driving control means for outputting a decelerating signal for changing a control speed to the rotation speed controller on the basis of a result of comparison output from the first decelerating position comparing means, a brake device capable of decreasing at least the rotation speed on the basis of a result of comparison output from the second decelerating position comparing means, and brake control means for outputting a brake signal to the brake device.

The second aspect of the present invention is directed to the positioning apparatus, wherein the pulse counting means is formed by cycle counting means using a previously given target value as a cycle.

The third aspect of the present invention is directed to the positioning apparatus, wherein the pulse counting means includes first pulse counting means for performing addition by the normal rotation of the rotary shaft and performing subtraction by the reverse rotation of the rotary shaft, and second pulse counting means for performing the subtraction by the normal rotation of the rotary shaft and performing the addition by the reverse rotation of the rotary shaft, the positioning apparatus further comprising code discriminating means for deciding whether a relationship between a position of the control object and the target position is a passage or this side in response to the discriminating signal output from the normal-reverse rotation discriminating circuit and a zero coincidence signal of the count value of the second pulse counting means, and display means for displaying a displacement of the control object from the target position on the basis of a result of discrimination of the code discriminating means and results of count of the first and second pulse counting means.

According to the first aspect of the present invention, the rotary shaft is rotated so that the rotation detecting sensor outputs two or more pulses having a phase difference, the normal-reverse rotation discriminating means outputs the discriminating signals of the normal and reverse rotation of the rotary shaft on the basis of the relationship between the phases of the two or more pulses output from the rotary detecting sensor, the pulse counting means adds or subtracts the pulses output from the rotation detecting sensor in response to the discriminating signal output from the normal-reverse rotation discriminating circuit, the decelerating position comparing means compares the value counted by the pulse counting means with the first and second decelerating positions held by the first and second decelerating position storing means, the driving control means outputs the decelerating signal for changing the control speed to the rotation speed controller on the basis of the result of comparison output from the first decelerating position comparing means, and the rotation speed controller performs inverter control for rotating the rotary shaft of the rotation driving source at a constant speed in response to the decelerating signal, the brake control means outputs the brake signal to the brake controller on the basis of the result of comparison output from the second decelerating position comparing means, and the brake device decreases the rotation speed in response to the brake signal.

According to the second aspect of the present invention, the pulse counting means uses the previously given target value as a cycle to add or subtract the pulses output from the rotation detecting sensor such that the result of count is cyclically changed.

According to the third aspect of the present invention, in response to the normal-reverse rotation discriminating signal, the first pulse counting means adds the pulses output from the rotation detecting sensor by the normal rotation of the rotary shaft and subtracts the pulses by the reverse rotation of the rotary shaft, the second pulse counting means subtracts the pulses output from the rotation detecting sensor by the normal rotation of the rotary shaft and adds the pulses by the reverse rotation of the rotary shaft, the code discriminating means decides whether the relationship between the position of the control object and the target position is the passage or this side in response to the discriminating signal output from the normal-reverse rotation discriminating circuit and the zero coincidence signal of the count value output from the second pulse counting means, and the display means selectively displays either of the results of count of the first and second pulse counting means on the basis of the result of discrimination of the code discriminating means together therewith.

DETAILED DESCRIPTION OF THE PREFERRED EMBODIMENT

Figure 1:
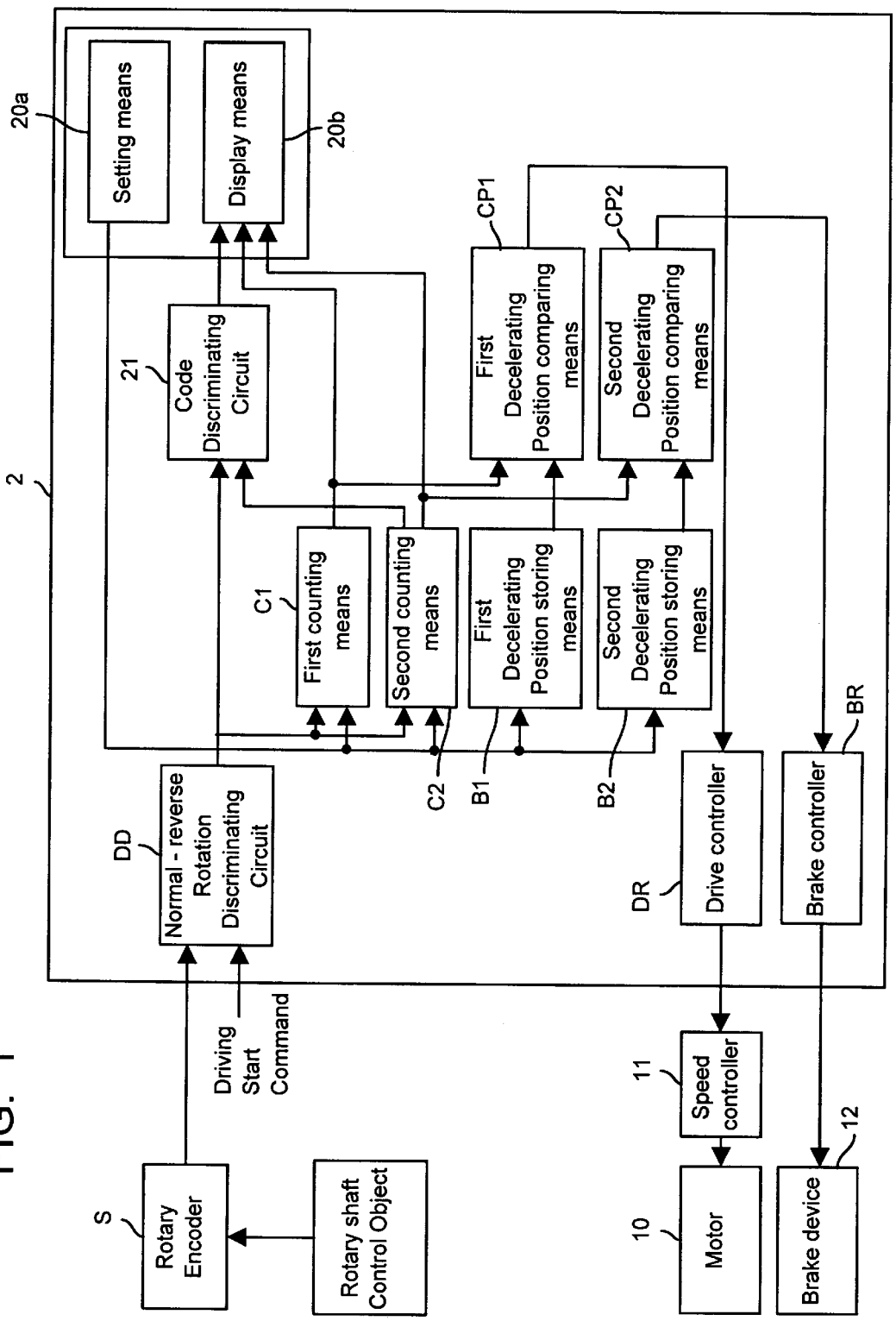
FIG. 1 is a block diagram showing an example of a structure of a positioning apparatus according to the present invention.

FIG. 1 shows an example of a structure of a positioning apparatus according to the present invention. A positioning apparatus 1 has two decelerating positions.

The positioning apparatus 1 comprises a motor 10 acting as a rotation driving source for driving a rotary shaft which rotates or rectilinearly drives a control object, a speed controller 11 acting as a rotation speed controller for controlling a rotation speed of the motor 10 by inverter control, a brake device 12 capable of decreasing at least the rotation speed of the rotary shaft, a rotary encoder S acting as a rotation detecting sensor coupled to the rotary shaft for detecting rotation of the rotary shaft, and a controller 2 for outputting a decelerating signal to the speed controller 11 or outputting a brake signal to the brake device 12 in response to a pulse output from the rotary encoder S.

The controller 2 includes a normal-reverse rotation discriminating circuit DD for discriminating normal rotation of a drive shaft from reverse rotation thereof and outputting a normal-reverse rotation discriminating signal and a pulse for pulse counting means in response to a pulse output from the rotary encoder S attached to the drive shaft and a rotation direction command signal input from an outside, first and second pulse counting means C1 and C2 which act as up-down counters for subtracting or adding the pulse for the pulse counting means in response to the normal-reverse rotation discriminating signal output from the normal-reverse rotation discriminating circuit DD and serve to cyclically perform counting operation by using, as a cycle, a value set as a target position by setting means 20a, first and second decelerating position storing means B1 and B2 for holding first and second decelerating positions represented by angles formed with respect to the target position as a position where decelerating braking operation of the control object in two stages is started, first and second decelerating position comparing means CP1 and CP2 for comparing a count value of the first counting means C1 with the decelerating positions held by the first and second decelerating position storing means B1 and B2, a code discriminating circuit 21 for discriminating this side of the target position or a passage therethrough in response to the normal-reverse rotation discriminating signal output from the normal-reverse rotation discriminating circuit DD and a zero coincidence signal output from the second pulse counting means C2, a drive controller DR for outputting a control signal for speed change to the speed controller 11 in response to a coincidence signal output from the first decelerating position comparing means CP1, a brake controller BR for outputting a control signal for braking operation to the brake device 12 in response to a coincidence signal output from the second decelerating position comparing means CP2, setting means 20a for setting the target position and the first and second decelerating positions, and display means 20b for displaying a position of the control object as a displacement from the target position in response to a code discriminating signal output from the code discriminating circuit 21 and a value of the first or second pulse counting means C1 or C2.

First of all, basic positioning operation of the positioning apparatus 1 will schematically be described below.

An operator presets a target value and first and second decelerating positions by using the setting means 20a. First and second rotation speeds are set to the speed controller 11.

The speed controller 11 controls the motor 10 so as to perform rotation at the preset first rotation speed on receipt of a driving start command of the motor 10 from an outside. Accordingly, when the rotation speed is gradually increased to reach the first rotation speed, the motor 10 rotates at a constant speed. At this time, the normal-reverse rotation discriminating circuit DD receives a rotation direction command signal from the outside.

When the control object reaches the preset first decelerating position, a control signal for speed change is output from the drive controller DR to the speed controller 11. Consequently, the speed controller 11 controls the motor 10 so as to perform rotation at the preset second rotation speed.

Furthermore, when the control object reaches the preset second decelerating position, a brake signal is output from the brake controller BR. Consequently, the brake device 12 operates so that the rotation speed is decreased and the control object is stopped at the target position.

Figure 2:
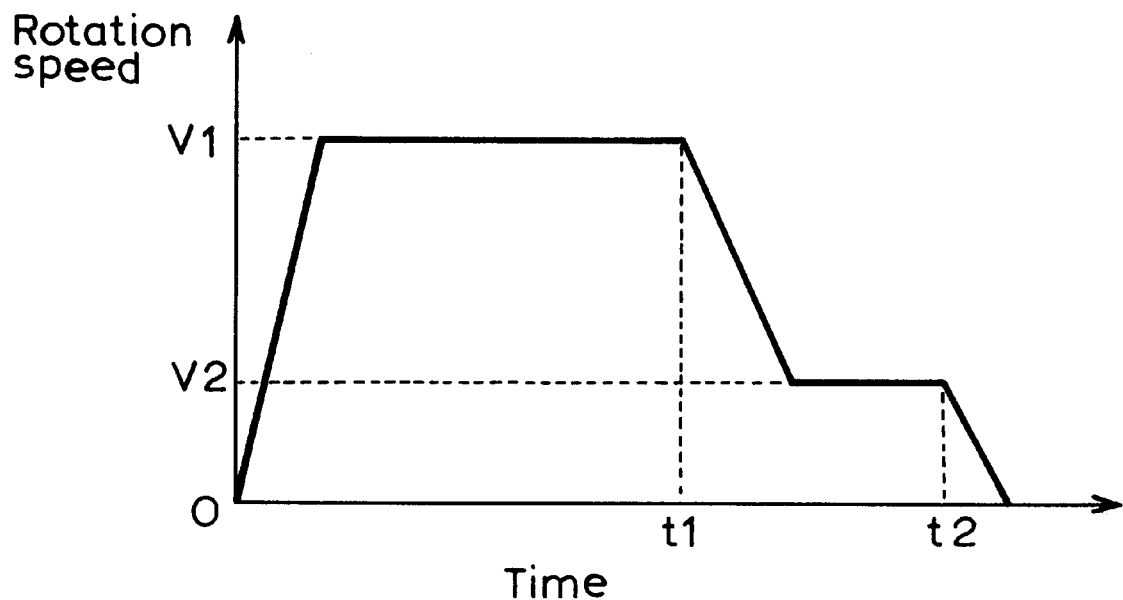
FIG. 2 is a chart showing a driving state of a control object obtained by the positioning apparatus according to the present invention.

This state is shown in FIG. 2 in which an axis of abscissa represents a time passed after the driving start command is sent, and an axis of ordinate represents the rotation speed of the rotary shaft. In FIG. 2, t1 and t2 denote times at which the control object reaches the first and second decelerating positions and the coincidence signals are output from the first and second decelerating position comparing means CP1 and CP2, and V1 and V2 denote first and second speeds which are preset to the speed controller 11.

The structure of the positioning apparatus 1 according to the present invention will be described below in more detail.

The setting means 20a serves to preset parameters necessary for positioning control such as a target value, the first and second decelerating positions and the like, and is formed by an in-line package switch, a keyboard and the like. Similarly, parameters necessary for control such as the first and second rotation speeds and the like are set to the speed controller 11.

The target value is expressed as a pulse count quantity of the pulse counting means corresponding to a rotation angle of the rotary shaft which is formed between a current position and a control target position where the control object is to be driven. The first decelerating position has a value expressed as a pulse count quantity of the pulse counting means corresponding to a rotation angle of the drive shaft which is formed between a position where first deceleration is to be started and the target position. The second decelerating position has a value expressed as a pulse count quantity of the pulse counting means corresponding to a rotation angle of the drive shaft which is formed between a position where second deceleration is to be started and the target position.

The first and second decelerating operation performs deceleration in two stages. The first deceleration indicates that the rotation speed of the motor 10 to be controlled by the speed controller 11 is changed from a first rotation speed to a second rotation speed which is lower than the first rotation speed in response to the control signal output from the drive controller DR. The second deceleration indicates that a brake is operated to perform deceleration and stoppage in response to the control signal output from the brake controller BR.

The rotary encoder S provided on the rotary shaft serves to output pulses having A and B phases with rotation of the rotary shaft. A pulse signal is input to the normal-reverse rotation discriminating circuit DD.

The normal-reverse rotation discriminating circuit DD discriminates normal rotation of the drive shaft from reverse rotation thereof in response to the rotation direction command signal sent as a rotation direction of the drive shaft from the outside and the current pulse output from the rotary encoder S. In other words, if the rotation direction is the same as a specified rotation direction, it is judged that rotation is normal. If the rotation direction is reverse to the specified rotation direction, the rotation is reverse.

The first pulse counting means C1 is initialized to the target value set by the setting means 20a after turning on or resetting before first control is started, counts the pulse output from the rotary encoder S by subtraction if the drive shaft is normally rotated, and counts the pulse output from the rotary encoder S by addition if the drive shaft is reversely rotated. Accordingly, when the control object reaches the target position, the count value becomes equivalent to 0. When the control object is stopped on this side of the target position, a pulse number corresponding to the rotation angle up to the target position is held. The first pulse counting means C1 serves as cycle counting means for using a target value as a cycle, in which the target value is obtained if 1 pulse is subtracted from a count value 1 and a value of 1 is obtained if 1 pulse is added to a count value equal to the target value. Accordingly, the value equivalent to 0 is the target value. In second and subsequent control operation, it is not necessary to perform the initialization. A displacement of a stop position of the control object from the target position, that is, a control error is not accumulated.

The second pulse counting means C2 is initialized to a count value of 0 after turning on or resetting before first control is started, counts the pulse output from the rotary encoder S by addition if the drive shaft is normally rotated, and counts the pulse output from the rotary encoder S by subtraction if the drive shaft is reversely rotated. More specifically, the second pulse counting means C2 performs addition and subtraction reversely to the first pulse counting means C1. The second pulse counting means C2 serves as cycle counting means using a target value as a cycle, in which a value of (the target value−1) is obtained if 1 pulse is subtracted from the count value of 0 and a value of 0 is obtained if 1 is added to the value of (target value−1). Accordingly, when the control object reaches the target position, the count value is set to 0. When the control object passes through the target position, a pulse number corresponding to a rotation angle from the target position is held. In second and subsequent control operation, it is not necessary to perform the initialization. Furthermore, the second pulse counting means C2 outputs a zero coincidence signal to the code discriminating circuit 21 when the count value is 0.

The code discriminating circuit 21 performs the following operation. If the zero coincidence signal is output from the second pulse counting means C2, a signal (Z) indicative of coincidence with the target position is output. If the normal-reverse rotation discriminating signal output from the normal-reverse rotation discriminating circuit DD is "normal" after the zero coincidence signal is output from the second pulse counting means C2, a signal (+) indicative of the passage through the target position is output. If the normal-reverse rotation discriminating signal output from the normal-reverse rotation discriminating circuit DD is "reverse", a signal (−) indicative of this side of the target position is output. Consequently, a relationship between the position of the control object and the target position, that is three kinds of results of discrimination of the coincidence with the target position, the passage through the target position and this side of the target position are output as code discriminating signals.

The first and second decelerating position storing means B1 and B2 hold the first and second decelerating positions set by the setting means 20a, respectively.

The first decelerating position comparing means CP1 compares the count value of the first pulse counting means C1 with the first decelerating position stored in the first decelerating position storing means B1. If the count value is coincident with the first decelerating position, a coincidence signal is output to the drive controller DR.

The second decelerating position comparing means CP2 compares the count value of the second pulse counting means C2 with the second decelerating position stored in the second decelerating position storing means B2. If the count value is coincident with the second decelerating position, a coincidence signal is output to the brake controller BR.

The driving controller DR outputs a control signal to the speed controller 11 to give an command to perform control at the second rotation speed in response to the coincidence signal output from the first decelerating position comparing means CP1.

The speed controller 11 serves as a speed controller using an inverter device or the like as a power supply for changing a frequency and performing control to set the rotation speed of the motor 10 to a constant speed. First and second speeds are preset, and either of them is selected in response to the control signal output from the drive controller DR. Consequently, the motor 10 is controlled.

The brake controller BR outputs a control signal to the brake device 12 in response to the coincidence signal output from the second decelerating position comparing means CP2, thus giving a command to perform braking operation.

An electromagnetic brake, a clutch brake or the like may be used as the brake device 12. Furthermore, an electronic brake, for example, DC dynamic braking or the like of the speed controller can be used as the brake device 12, without using a special brake device.

The display means 20b serves to display a position of the control object as a displacement from the target position. The display means 20b displays a code "+" and the count value of the second pulse counting means C2 as a displacement on a LED or a liquid crystal panel if the code discriminating signal is (+), displays the code "−" and the count value of the first pulse counting means C1 as a displacement if the code discriminating signal is (−), and displays "0" if the code discriminating signal is (Z).

Figure 3A:
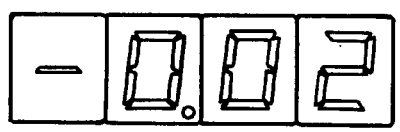
FIGS. 3(a) and 3(b) are diagrams showing examples of display of a display section of the positioning apparatus according to the present invention.
Figure 3B:
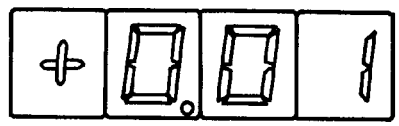

An example of the display means 20b is shown in FIGS. 3(a) and 3(b). FIG. 3(a) shows a case in which the code discriminating signal is (−). Therefore, the code "−" and a count value of 0.02 of the first pulse counting means C1 are displayed. FIG. 3(b) shows a case in which the code discriminating signal is (+). Therefore, the code "+" and a count value of 0.01 of the second pulse counting means C2 are displayed.

In this way, the displacement of the position of the control object from the target position can be displayed on the basis of the count values of the first and second pulse counting means C1 and C2 and the results of discrimination of the code discriminating circuit 21.

More specifically, either of the count values of the first and second pulse counting means C1 and C2 is selected and displayed on the basis of the results of discrimination of the code discriminating circuit 21. Consequently, the displacement of the position of the control object from the target position can precisely be displayed at a high speed without using an arithmetic device.

According to the positioning apparatus of the present invention, positioning control is performed by decelerating braking performed by decreasing the rotation speed of the speed controller and decelerating braking performed by braking operation of the brake device. Therefore, the control object can be stopped at the target position with high precision. In other words, it is possible to position the rotation driving source with high precision, which cannot be implemented by only inverter control. As compared with a case in which braking operation is performed by only the brake device, wear and heat generation of a brake disc can be reduced more.

The speed controller is used for controlling the rotation driving source. Therefore, the positioning apparatus of the present invention can easily be applied to an existing positioning control system for performing positioning control by the inverter control.

According to the positioning apparatus of the present invention, the pulse counting means is formed by cycle counting means using a target value as a cycle. Therefore, when continuous control is performed, an error of positioning control is not accumulated. Consequently, even if the positioning control is performed repeatedly, positioning precision is not reduced.

In the case where the count value of the counting means is temporarily held by latch means or the like and a reading processing is executed by a microcomputer or the like, a result of calculation is caused to include an error due to fine motion of the rotary shaft during the holding and the calculation. If a distance to a next target position, that is a target value is determined on the basis of the result of the calculation to perform the positioning control, the target value is caused to include an error. Consequently, the error is accumulated. However, if the positioning apparatus according to the present invention is used, such error accumulation is not caused.

As compared with a structure in which the error accumulation is prevented by zero point correction of the rotary encoder, particularly, the error accumulation is not caused even if a driving distance to the target position is less than one rotation of the rotary shaft. Therefore, the positioning control can be performed with higher precision.

Furthermore, the positioning apparatus according to the present invention can display the displacement of the position of the control object from the target position without performing calculation. Therefore, the displacement can surely be displayed at a high speed.

As compared with a case in which the count value of the counting means is temporarily held by the latch means or the like to perform the reading processing by using the microcomputer or the like as described above, the result of the calculation is caused to include an error due to the fine motion of the rotary shaft during the holding and the calculation and a value of the displacement to be displayed is caused to include the error. However, since the positioning apparatus of the present invention performs no calculation, the microcomputer is not required. In addition, the error is not made with a simple circuit structure. Thus, it is possible to inexpensively provide the positioning apparatus capable of surely displaying the displacement at a high speed.

Although the present invention has fully been described by way of example with reference to the accompanying drawings, it is to be understood that various changes and modifications will be apparent to those skilled in the art.

Therefore, unless otherwise such changes and modifications depart from the scope of the invention, they should be construed as being included therein.

What is claimed is:

1. A positioning apparatus comprising:

a rotation detecting sensor coupled to a rotary shaft for rotating or rectilinearly driving a control object for outputting two or more pulses having a phase difference with rotation of the rotary shaft:

normal-reverse rotation discriminating means for discriminating normal rotation of the rotary shaft from reverse rotation thereof on the basis of a relationship between phases of the two or more pulses output from the rotation detecting sensor;

pulse counting means for adding or subtracting the pulses output from the rotation detecting sensor in response to a discriminating signal output from the normal-reverse rotation discriminating circuit;

first decelerating position storing means for holding at least one decelerating position where low-speed driving operation is to be started;

second decelerating position storing means for holding at least one decelerating position where braking operation is to be started;

first and second decelerating position comparing means for comparing a value counted by the pulse counting means with first and second decelerating positions held by the first and second decelerating position storing means;

a rotation driving source for rotating the rotary shaft;

a rotation speed controller for rotating the rotary shaft of the rotation driving source at a constant speed by inverter control;

driving control means for outputting a decelerating signal for changing a control speed to the rotation speed controller on the basis of a result of comparison output from the first decelerating position comparing means;

a brake device capable of decreasing at least the rotation speed on the basis of a result of comparison output from the second decelerating position comparing means; and brake control means for outputting a brake signal to the brake device.

2. The positioning apparatus according to claim 1, wherein the pulse counting means is formed by cycle counting means using, as a cycle, a target value previously given as a count quantity of the pulse counting means corresponding to a rotation angle of a drive shaft from a current position to a target position where the control object is to be driven.

3. The positioning apparatus according to claim 2, wherein the pulse counting means includes first pulse counting means for performing addition by the normal rotation of the rotary shaft and performing subtraction by the reverse rotation of the rotary shaft, and second pulse counting means for performing the subtraction by the normal rotation of the rotary shaft and performing the addition by the reverse rotation of the rotary shaft, the positioning apparatus further comprising;

code discriminating means for deciding whether the relationship between the position of the control object and the target position is that the control object has passed the target position, or that the control object has not passed the target position in response to the discriminating signal output from the normal-reverse rotation discriminating circuit and a zero coincidence signal of the count value of the second pulse counting means; and display means for displaying a displacement of the control object from the target position on the basis of a result of discrimination of the code discriminating means and results of count of the first and second pulse counting means.

* * * * *